United States Patent [19]

Yoshino

[11] Patent Number: 5,410,464
[45] Date of Patent: Apr. 25, 1995

[54] VOLTAGE-TYPE SELF-COMMUTATED CONVERSION SYSTEM WITH VOLTAGE CONTROL

[75] Inventor: Teruo Yoshino, Tokyo, Japan

[73] Assignee: Kabushiki Kaisha Toshiba, Kawasaki, Japan

[21] Appl. No.: 158,275

[22] Filed: Nov. 29, 1993

[30] Foreign Application Priority Data

Mar. 10, 1993 [JP] Japan .................................. 5-049053

[51] Int. Cl.⁶ ............................................. H02H 7/122
[52] U.S. Cl. ......................................... 363/58; 363/96; 363/98; 363/132; 361/18
[58] Field of Search .................... 363/55, 56, 57, 58, 363/96, 132, 98, 137; 361/18, 20, 31

[56] References Cited

U.S. PATENT DOCUMENTS

| | | | |
|---|---|---|---|
| 4,581,693 | 4/1986 | Ueda et al. | 363/96 X |
| 4,675,799 | 6/1987 | Suzuki et al. | 363/58 |
| 4,819,157 | 4/1989 | Hirose et al. | 363/56 |
| 5,010,467 | 4/1991 | Tokiwa et al. | |

FOREIGN PATENT DOCUMENTS 0105510  4/1984  European Pat. Off. .

*Primary Examiner*—A. D. Pellinen
*Assistant Examiner*—Y. J. Han
*Attorney, Agent, or Firm*—Oblon, Spivak, McClelland, Maier & Neustadt

[57] ABSTRACT

A voltage-type self-commutated conversion system including a voltage-type self-commutated power converter with a plurality of anti-parallel circuits of a self-turn-off device and a diode. DC terminals of the power converter are connected to DC bus lines of the voltage-type self-commutated conversion system. The voltage-type self-commutated conversion system further includes a DC capacitor connected between the DC bus lines, a transformer connected between an AC system and AC terminals of the power converter and a control circuit for controlling the power converter. The control circuit includes a gate control circuit for generating gate signals for determining conduction periods of the self-turn-off devices in the power converter, a first protection circuit for turning on the self-turn-off devices connected to positive side of the DC bus line in case of protective shutdown of the power converter and a second protection circuit for turning off the self-turn-off devices connected to negative side of the DC bus line in case of the protective shutdown of the power converter.

6 Claims, 5 Drawing Sheets

VOLTAGE-TYPE SELF-COMMUTATED CONVERSION SYSTEM WITH VOLTAGE CONTROL

BACKGROUND OF THE INVENTION

1. Field of the Invention

This invention relates to a power conversion system, and more particularly to a voltage-type self-commutated conversion system such as a self-commutated reactive power compensator device which performs voltage control, reactive power control and so forth of a power system and a self-commutated power conversion system which performs power interchange by means of DC transmission and frequency conversion.

2. Description of the Related Art

FIG. 4, a diagram for the purpose of explaining the prior aft, shows a voltage-type self-commutated power converter 1 (referred to simply as a converter below) which connects to an AC system 4 via a 3-phase system connection transformer 3, together with its control devices. Element 2 is a DC capacitor, 8, 9 and 10 are current transformers (CTs), 11 is a converter output voltage reference computation circuit, 12 is a synchronization detection circuit, 13 is an active current setting device, 14 is a reactive current setting device, 15 is a PWM gate control circuit and 20 is a protection circuit for the converter 1.

In FIG. 4, the converter 1 is composed of self-turn-off devices GU, GV, GW, GX, GY and GZ, for example GTOs (gate turn-off thyristors), power transistors, static induction thyristors and other power electronic devices with a self-turn-off function, together with diodes, DU, DV, DW, DX, DY and DZ connected respectively in anti-parallel with each self-turn-off device.

Hereinafter, an explanation will be given in the case where the converter 1 is operated as an inverter for converting DC input power into AC output power. The 3-phase output voltage of the converter 1 in a system with this kind of construction can be controlled by varying the conducting period of the self-turn-off devices, GU, GV, GW, GX, GY and GZ. The current received from or delivered to the AC system 4 via the impedance of the system connection transformer 3 is controlled by adjusting the phase angle and amplitude of the 3-phase output voltage of the converter 1 in accordance with the phase angle and amplitude of the system voltage VR, VS and VT of the AC system 4. By this means, the voltage-type self-commutated conversion system composed of the converter 1, the DC capacitor 2 and the system connection transformer 3 can either exchange active power with the AC system 4 by converting DC power to active power or compensate the reactive power of the AC system 4.

The converter output voltage reference computation circuit 11, the synchronization detection circuit 12, the active current setting device 13, the reactive current setting device 14 and the PWM gate control circuit 15 constitute a control device for the voltage-type self-commutated conversion system which controls the active power and reactive power.

The synchronization detection circuit 12 detects the system voltage phase angle $\theta$ of the system voltages VR, VS and VT of the 3-phase AC system 4. The converter output voltage reference computation circuit 11 computes converter output voltage references VRc, VSc and VTc which determine the output voltage of the 3 phases of the converter 1 in order to regulate the converter output AC currents iR, iS and iT detected by the current transformers 8, 9 and 10 in accordance with an active current reference iqc from the active current setting device 13 and a reactive current reference idc from the reactive current setting device 14.

The converter output voltage reference computation circuit 11 determines the phase angles of the converter output voltage references VRc, VSc and VTc to the system voltages VR, VS and VT based on the system voltage phase angle $\theta$ detected by the synchronization detection circuit 12.

The PWM gate control circuit 15 outputs gate signals U1, V1, W1, X1, Y1 and Z1 which determine the conducting periods of the self-turn-off devices GU, GV, GW, GX, GY and GZ of the converter 1 by comparing the converter output voltage references VRc, VSc and VTc with a triangular wave carrier signal generated based on the system voltage phase angle $\theta$.

A protection signal P1 is generated from a protective relay element (not shown) in order to protect the converter 1 from overcurrent, overvoltage and so forth.

The construction of the protection circuit 20 will be described with reference to FIG. 5. The gate signals U1, V1, W1, X1, Y1 and Z1 from the PWM gate control circuit 15 are applied to first input terminals of AND circuits 20U, 20V, 20W, 20X, 20Y and 20Z, respectively. The protection signal P1 is applied to second input terminals of the AND circuits 20U, 20V, 20W, 20X, 20Y and 20Z through an inverter circuit 20I. The AND circuits 20U, 20V, 20W, 20X, 20Y and 20Z generate gate signals Ug, Vg, Wg, Xg, Yg and Zg, which are applied to gates of the self-turn-off devices GU, GV, GW, GX, GY and GZ of the converter 1, respectively.

When the protection signal p1 is not present, the protection circuit 20 generates the gate signals U1, V1, W1, X1, Y1 and Z1 as the gate signals Ug, Vg, Wg, Xg, Yg and Zg to the converter 1 to control the conducting periods of the self-turn-off devices GU, GV, GW, GX, GY and GZ, respectively. When the protection signal P1 is generated, the protection circuit 20 stops the gate signals U1, V1, W1, X1, Y1 and Z1 of the PWM gate control circuit 15 and generates gate signals Ug, Vg, Wg, Xg, Yg and Zg to turn off all the self-turn-off devices GU, GV, GW, GX, GY and GZ in order to protect the converter 1 from overcurrent, overvoltage and so forth in accordance with the protection signal P1 from a protective relay element not shown in the diagram.

The conventional voltage-type self-commutated conversion system shown in FIG. 4 suffers from the types of problems described below. Because the output voltage of the converter 1 and the AC voltage diverge, if the AC voltage is distorted owing to the introduction of the power capacitor or the transformer and so forth, which are connected to the AC system 4 and not shown in the diagram, the output AC current of the converter 1 can increase and become an overcurrent. When this happens, the overcurrent relay not shown in the diagram operates and the self-turn-off device GU, GV, GW, GX, GY and GZ are all turned off by the protection circuit 20.

FIG. 6 shows the state of the converter 1 immediately before the protection action. The dashed lines in FIG. 6 show the flow of current immediately before the protective action; for example, R-phase current is flowing in towards the + (positive) side DC bus line P of the converter 1 from the AC system 4 through the diode DU. The self-turn-off device GV has been turned on by PWM control, and S-phase current returns to the AC system 4 through the self-turn-off device GV. T-phase current returns to the AC system 4 from the DC capacitor 2 through the − (negative) side DC bus line N and the diode DZ.

If the R-phase current becomes an overcurrent in the situation of FIG. 6, the self-turn-off devices GU, GV, GW, GX, GY and GZ are all turned off by the action of the protection circuit 20 of FIG. 4. When this happens, S-phase current becomes unable to flow through the self-turn-off device GV and returns to the AC system 4 via the + (positive) side DC bus line P, the DC capacitor 2 and the diode DY. This flow of current is shown by a solid line.

The flow of current shown by the solid line in FIG. 6 is in the direction which charges up the DC capacitor 2. Since this charging current is a large one, sufficient for the overcurrent relay not shown in the diagram to operate, the DC voltage rises to some extent. Because of this, a DC overvoltage is generated and there is a risk of damage to the converter 1 or devices connected to the DC bus lines P and N.

With a conventional control and protection system, there is therefore, contrary to what is intended, a risk of generating a DC overvoltage as a result of the protective action of the converter. The withstand capability to overvoltage of a semiconductor device is inherently less than that to overcurrent, and it becomes damaged if the overvoltage exceeds its withstand capability even instantaneously. There is therefore a considerable risk of damaging the converter by the protective action instead of protecting it. There is consequently a danger of being unable to restart a voltage-type self-commutated conversion system after a voltage waveform distortion has abated, and the system's essential purpose, voltage control and reactive power control of power system or a power interchange, becomes impossible.

SUMMARY OF THE INVENTION

Accordingly, one object of this invention is to provide a voltage-type self-commutated conversion system which can in safety protectively shut down a voltage-type self-commutated power converter without raising the DC voltage.

These and other objects of this invention can be achieved by providing a voltage-type self-commutated conversion system including a voltage-type self-commutated power converter with a plurality of anti-parallel circuits of a self-turn-off device and a diode. DC terminals of the power converter are connected to DC bus lines of the voltage-type self-commutated conversion system. The voltage-type self-commutated conversion system further includes a DC capacitor connected between the DC bus lines, a transformer connected between an AC system and AC terminals of the power converter and a control circuit for controlling the power converter. The control circuit includes a gate control circuit for generating gate signals for determining conduction periods of the self-turn-off devices in the power converter, a first protection circuit for turning on the self-turn-off devices connected to a positive side of the DC bus lines in case of protective shutdown of the power converter and a second protection circuit for turning off the self-turn-off devices connected to a negative side of the DC bus lines in case of the protective shutdown of the power converter.

According to the invention, the self-turn-off devices connected to the + (positive) side DC bus line of the converter are turned on in accordance with a protection signal from the protection circuit. Contrarily, the self-turn-off devices connected to the − (negative) side DC bus line are turned off. As a result of this, no current flows into the DC capacitor, and the current returns to the AC system through one or other of the turned-on self-turn-off devices. The DC capacitor is thus not charged up, and the DC voltage does not rise.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
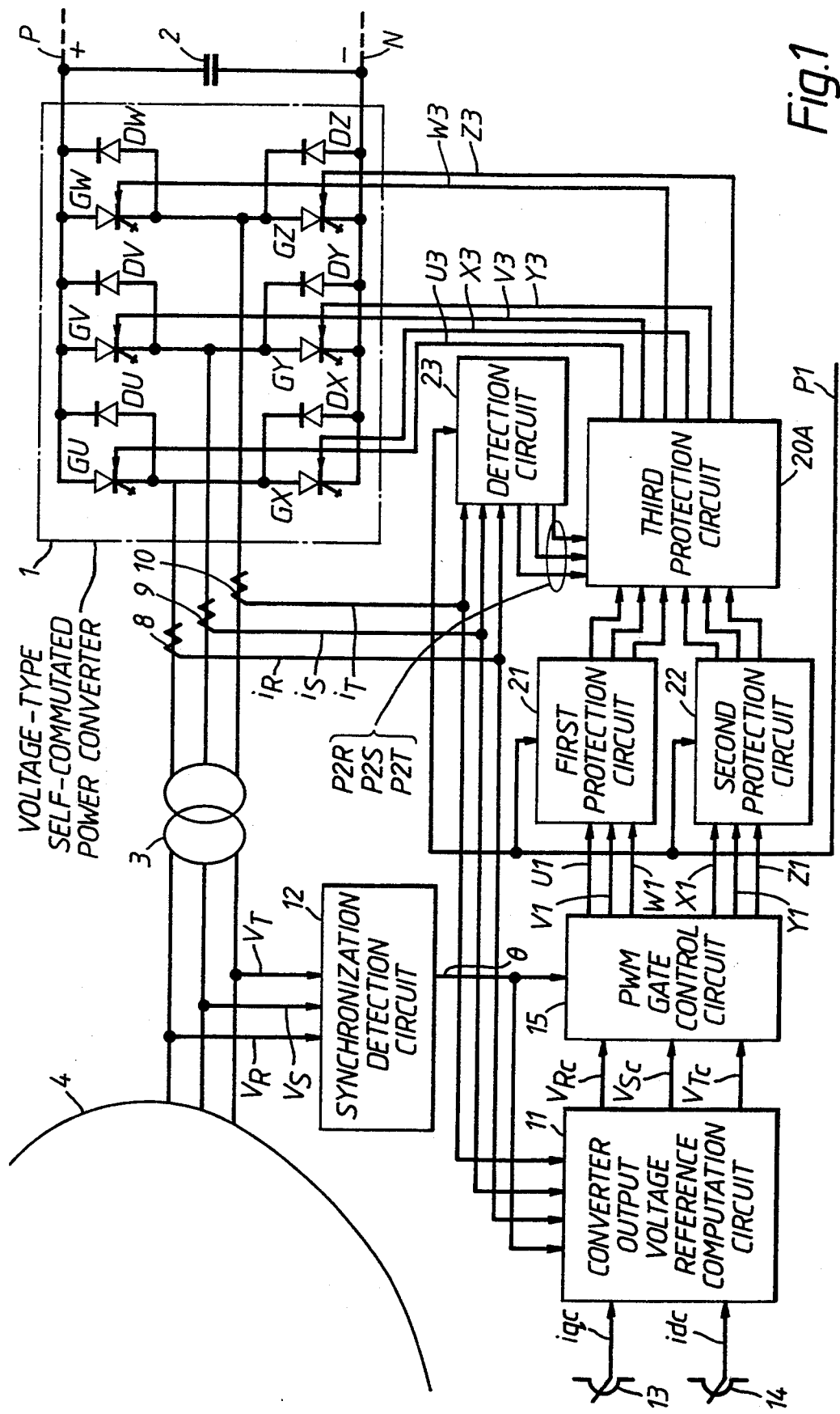
FIG. 1 is a circuit diagram illustrating a voltage-type self-commutated conversion system according to an embodiment of this invention.

Referring now to the drawings, wherein like reference numerals designate identical or corresponding parts throughout the several views, the embodiments of this invention will be described below.

FIG. 1 is a circuit diagram illustrating an embodiment of this invention; only the difference compared with the conventional example of FIG. 4 will be described. 21 is a first protection circuit constituting the first protection means which turns on the self-turn-off devices, GU, GV and GW connected to the + (positive) side DC bus line P of the converter 1 in accordance with the protection signal P1 from the protective relay element not illustrated, 22 is a second protection circuit constituting the second protection means which turns off the self-turn-off devices GX, GY and GZ connected to the − (negative) side DC bus line N of the converter 1 in accordance with the protection signal P1 from the protective relay element not illustrated, and 23 is a detection circuit which detects and generates detection signal P2R, P2S and P2T when the converter AC currents have become approximately zero under the condition that the protection signal P1 from the protection relay element not illustrated is present. 20A is a third protection circuit for generating gate signals U3, V3, W3, X3, Y3 and Z3 to the converter 1.

The construction of the first protection circuit 21, the second protection circuit 22, the third protection circuit 20A and the detection circuit 23 will be described with reference to FIG. 2.

Figure 2:
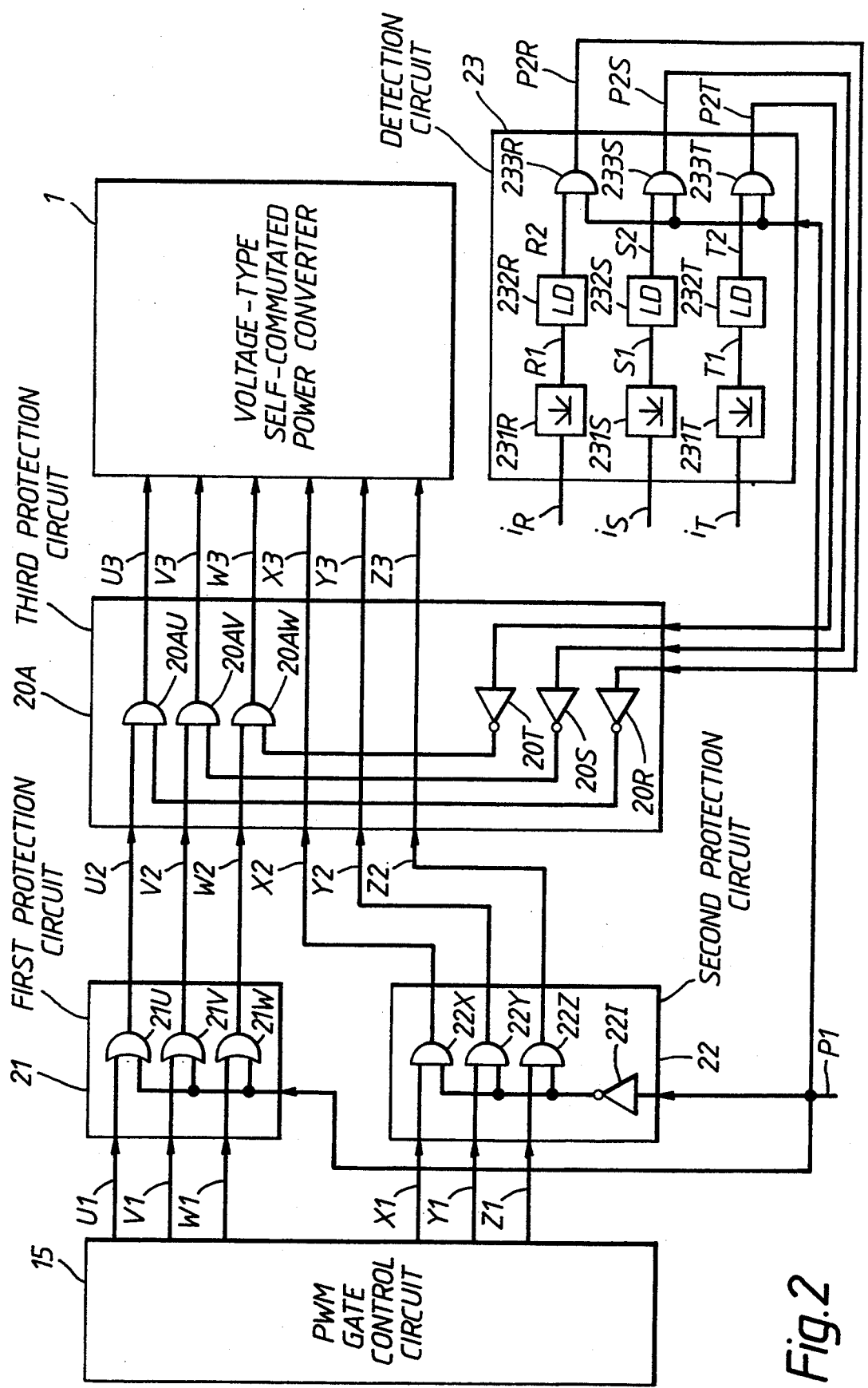
FIG. 2 is a circuit diagram illustrating the construction of the main portions of this invention shown in FIG. 1.
Figure 4:
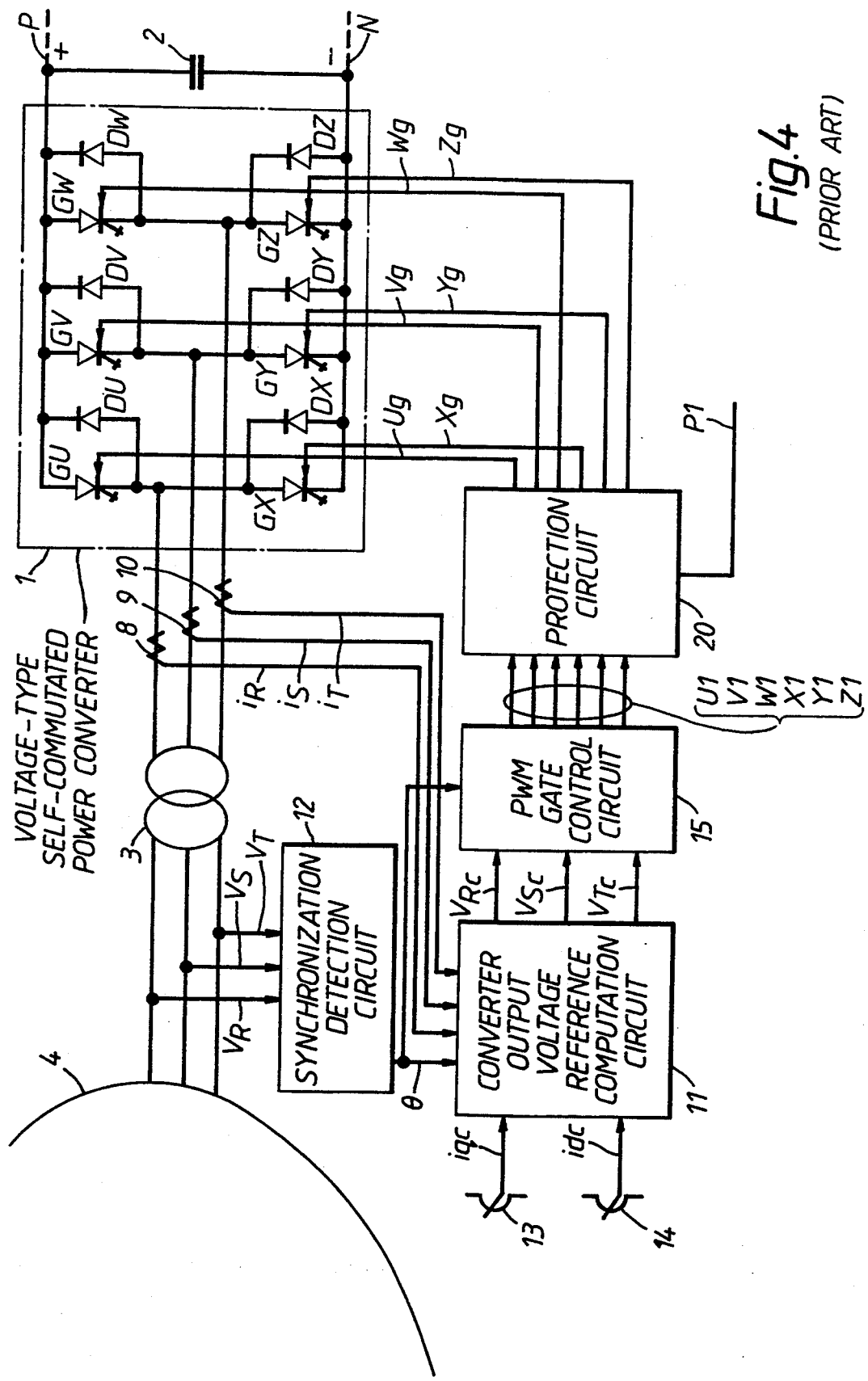
FIG. 4 is a circuit diagram illustrating a conventional voltage-type self-commutated conversion system.
Figure 5:
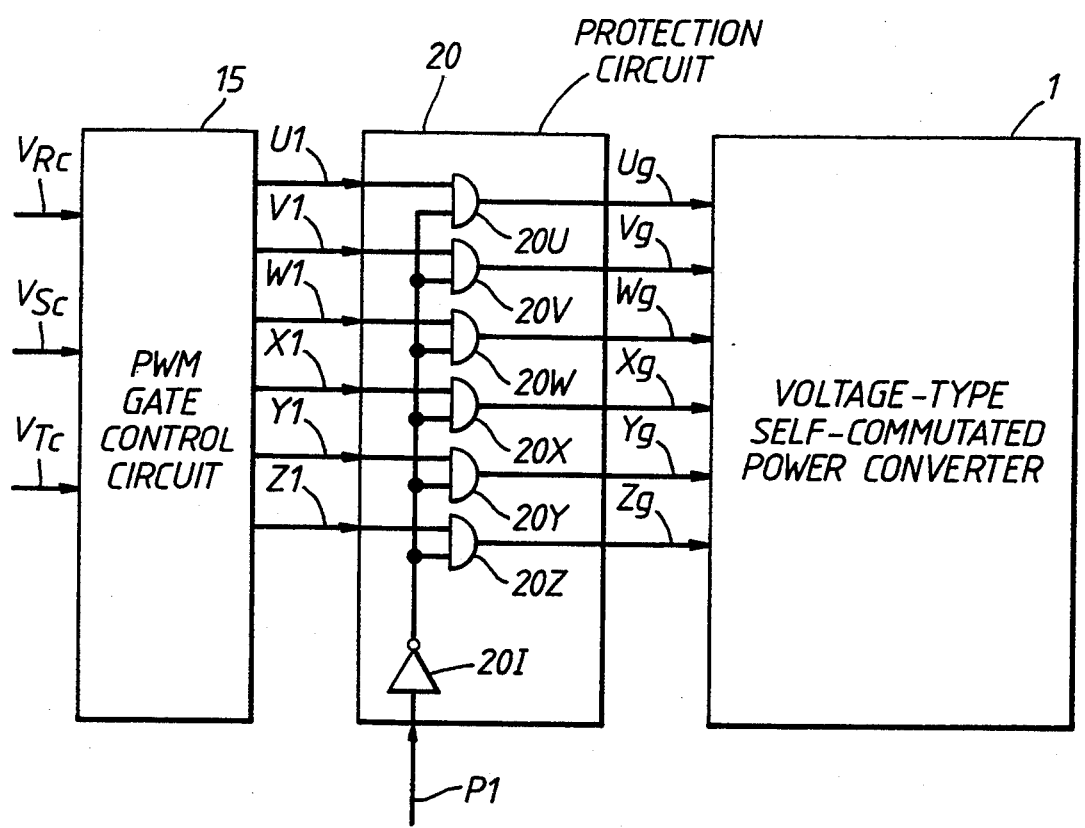
FIG. 5 is a circuit diagram illustrating the construction of the protection circuit 20 of FIG. 4.

In FIG. 2, the PWM gate control circuit 15 outputs the gate signals U1, V1, W1, X1, Y1 and Z1 which determine the conducting periods of the self-turn-off devices GU, GV, GW, GX, GY and GZ of the converter 1 as in FIG. 4.

The first protection circuit 21 is composed of OR circuits 21U, 21V and 21W. The gate signals U1, V1 and W1 from the PWM gate control circuit 15 are applied to first input terminals of the OR circuits 21U, 21V and 21W, respectively. The protection signal F1 is applied to second input terminals of the OR circuits 21U, 21V and 21W. The OR circuits 21U, 21V and 21W output gate signals U2, V2 and W2, respectively.

The second protection circuit 22 is composed of AND circuits 22X, 22Y and 22Z and an inverter circuit 22I. The gate signals X1, Y1 and Z1 from the PWM gate control circuit 15 are applied to first input terminals of the AND circuits 22X, 22Y and 22Z, respectively. The protection signal P1 is applied to second input terminals of the AND circuits 22X, 22Y and 22Z through the inverter circuit 22I. The AND circuits 22X, 22Y and 22Z output gate signals X2, Y2 and Z2, respectively.

The detection circuit 23 is composed of absolute value detection circuits 231R, 231S and 231T, level detection circuits 232R, 232S and 232T and AND circuits 233R, 233S and 233T.

The absolute value detection circuits 231R, 231S and 231T receive the converter output AC currents iR, iS and iT detected by the current transformers 8, 9 and 10, respectively, and detect the absolute values R1, S1 and T1 of the converter output AC currents iR, iS and iT, respectively. The level detection circuits 232R, 232S and 232T generate detection signals R2, S2 and T2 of the "1" state when the absolute values R1, S1 and T1 are below predetermined values, respectively. The detection signals R2, S2 and T2 are applied to first input terminals of the AND circuits 233R, 233S and 233T, respectively. The protection signal P1 is applied to second input terminals of the AND circuits 233R, 233S and 233T. Output signals of the AND circuits 233R, 233S and 233T which are the detection signals P2R, P2S and P2T are output as the output signals of the detection circuit, respectively. Namely, the detection signals P2R, P2S and P2T are generated when the converter AC currents iR, iS and iT have become approximately zero under the condition that the protection signal P1 is present.

The third protection circuit 20A is composed of AND circuits 20AU, 20AV and 20AW and inverter circuits 20R, 20S and 20T. The gate signals U2, V2 and W2 of the first protection circuit 21 are applied to first input terminals of the AND circuits 20U, 20V and 20W, respectively.

The detection signals P2R, P2S and P2T of the detection circuit 23 are applied to second input terminals of the AND circuits 20U, 20V and 20W through the inverter circuits 20R, 20S and 20T. The AND circuits 20AU, 20AV and 20AW output gate signals U3, V3 and W3 which are applied to gates of the self-turn-off devices GU, GV and GW, respectively.

The gate signals X2, Y2 and Z2 of the second protection circuit 22 are output as the gate signals X3, Y3 and Z3 of the third protection circuit 20A, which are applied to gates of the self-turn-off devices GX, GY and GZ, respectively.

In a normal state where the protection signal P1 is in the "0" state, the gate signals U3, V3, W3, X3, Y3 and Z3, which are equal to the gate signals U1, V1, W1, X1, Y1 and Z1, are applied to the gates of the self-turn-off devices GU, GV, GW, GX, GY and GZ to control the conducting periods thereof, respectively.

In an abnormal state where the protection signal P1 is turned to the "1" state, the gate signals U2, V2 and W2 are then turned to the "1" state. As the output signals P2R, P2S and P2T are in the "0" state, the gate signals U3, V3 and W3 are turned to the "1" state, thereby to turn on the self-turn-off devices GU, GV and GW, respectively. When the protection signal P1 is turned to the "1" state, the gate signals X2, Y2 and Z2 are turned to the "0" state. The gate signals X2, Y2 and Z2 are output as the gate signals X3, Y3 and Z3 thereby to turn off the self-turn-off devices GX, GY and GZ, respectively.

Then, when the converter AC currents iR, iS and iT have been approximately zero, the detection circuit 23 generates the detection signals P2R, P2S and P2T of the "1" state. At this time, the gate signals U3, V3 and W3 become to "0" state, thereby to turn off the self-turn-off devices GU, GV and GW, respectively. The gate signals X3, Y3 and Z3 continues to be "0" state, so that the self-turn-off devices GX, GY and GZ continue to be in the off state.

Figure 6:
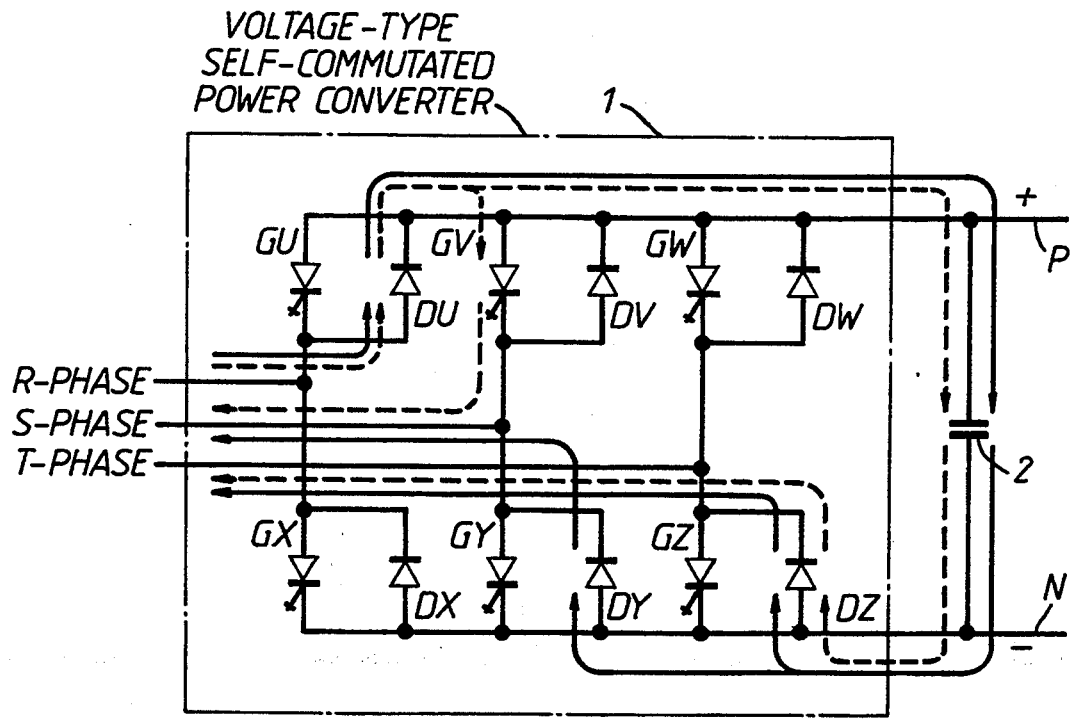
FIG. 6 is a diagram for explaining the protective operation of the system shown in FIG. 4.

The operation and effects of this embodiment will now be explained with reference to FIG. 3. The dashed lines in FIG. 3 show the current-conducting state of the converter 1 immediately before protection; these are the same as the dashed lines in FIG. 6, which is for explaining the operation of the conventional example.

Figure 3:
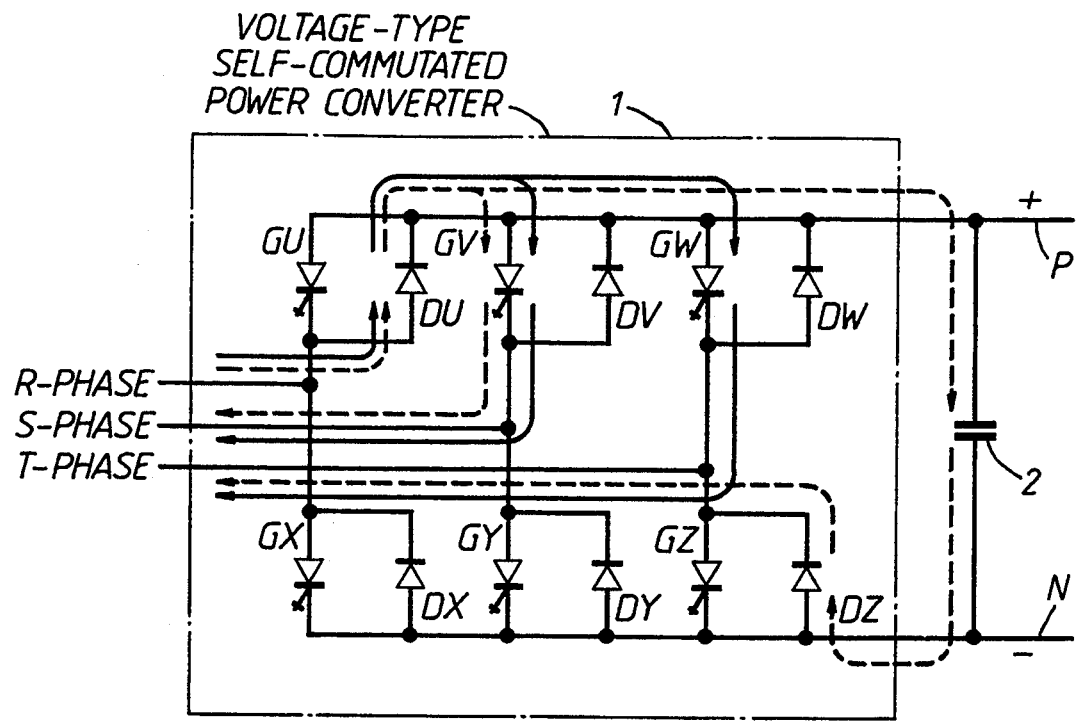
FIG. 3 is a diagram for explaining the operation and effects of the system shown in FIG. 1.

In the situation shown in FIG. 3, if the R-phase current becomes an overcurrent, the self-turn-off devices GU, GV and GW connected to the + (positive) side DC bus line P of the converter 1 are first turned on by means of the first protection circuit 21, and the self-turn-off devices GX, GY and GZ connected to the − (negative) side DC bus line N are turned off by means of the second protection circuit 22, in accordance with the protection signals P1 from the protective relay not shown in FIG. 1.

As a result of this, the R-phase current flowing through the diode DU returns to the AC system 4 through the turned-on self-turn-off devices GV and GW. Consequently, the DC capacitor 2 is not charged up and the DC voltage does not rise. This situation is shown by the solid lines in FIG. 3.

Next, at the moment when the instantaneous value of the current returning to the AC system 4 has become small, the detection circuit 23 outputs the detection signals P2R, P2S and P2T, the self-turn-off devices GU, GV and GW are turned off by means of the third protection circuit 20A, and the self-turn-off devices GX, GY and GZ continue to be in the off state, and the protection is completed.

As described above, there is no rise of DC voltage in the protective shutdown of the voltage-type self-commutated power converter 1 according to this embodiment.

Up to this point, the explanation has described a 3-phase voltage-type self-commutated power converter 1, but this invention can be applied similarly to a single-phase voltage-type self-commutated power converter. Likewise, a voltage-type self-commutated conversion system including a combination of one transformer, one voltage-type self-commutated power converter and one DC capacitor has been described in general terms, but the same applies even if it is a voltage-type self-commutated conversion system with a number of transformers and voltage-type self-commutated power converters connected.

According to the voltage-type self-commutated conversion system of this invention described above, in the protective shutdown of a voltage-type self-commutated power converter, the power converter can be shut down safely without the DC voltage rising. It can thus be restarted even if it has been shut down temporarily as a result of, for example, overcurrent due to AC voltage waveform distortion. It therefore has the advantages that the system's essential purpose that is voltage control and reactive power control of an electrical power system, or electrical power interchange can be continued and that it can help to make to the power systems safer.

Obviously, numerous modifications and variations of the present invention are possible in light of the above teachings. It is therefore to be understood that within the scope of the appended claims, the invention may be practiced otherwise than as specifically described herein.

What is claimed is:

1. A voltage-type self-commutated conversion system, comprising:
   a power converter with a plurality of anti-parallel circuits of a self-turn-off device and a diode;
   said power converter being a voltage-type self-commutated power converter;
   DC terminals of said power converter being connected to DC bus lines of said voltage-type self-commutated conversion system;
   a DC capacitor connected between said DC bus lines;
   a transformer connected between an AC system and AC terminals of said power converter; and
   control means for controlling said power converter;
   said control means including:
   gate control means for generating gate signals for determining conduction periods of said self-turn-off devices in said power converter,
   first protection means for turning on said self-turn-off devices connected to a positive side of said DC bus lines in case of protective shutdown of said power converter, and
   second protection means for turning off said self-turn-off devices connected to a negative side of said DC bus lines in case of said protective shutdown of said power converter.

2. The voltage-type self-commutated conversion system according to claim 1:
   wherein said control means further includes detection means for detecting that AC currents of said power converter become approximately zero after said protective shutdown of said power converter and for turning off said self-turn-off devices connected to positive side of said DC bus lines based on a detection result.

3. A voltage-type self-commutated conversion system, comprising:
   a voltage-type self-commutated power converter with a plurality of anti-parallel circuits of a self-turn-off device and a diode;
   DC terminals of said voltage-type self-commutated power converter being connected to DC bus lines of said voltage-type self-commutated conversion system;
   a DC capacitor connected between said DC bus lines;
   a transformer connected between an AC system and AC terminals of said voltage-type self-commutated power converter; and
   control means for controlling said voltage-type self-commutated power converter;
   said control means including;
   an active current setting device means for setting an active current reference;
   a reactive current setting device for setting a reactive current reference;
   a converter output voltage reference computation circuit connected to receive said active current reference, said reactive current reference, a phase angle of system voltages of said AC system and AC currents of said voltage-type self-commutated power converter for generating converter output voltage references so as to regulate said AC currents;
   PWM gate control circuit connected to receive said phase angle and said converter output voltage reference for generating gate signals which determine conduction periods of said self-turn-off devices of said voltage-type self-commutated power converter;
   a protection signal generating circuit for generating a protection signal in case of protective shutdown of said voltage-type self-commutated power converter;
   a detection circuit connected to receive said protection signal and said AC currents of said voltage-type self-commutated power converter for detecting that said AC currents become approximately zero after said protection signals is generated to generate a detection signal; and
   protection means connected to receive said gate signals, said protection signal and said detection signal for generating output signals,
   said output signals being determined such that said output signals include said gate signals when said protection signal and said detection signal are not generated, said output signals include gate turn on signals for said self-turn-off devices connected to positive side of said DC bus lines and gate turn off signals for said self-turn-off devices connected to negative side of said DC bus lines when said protection signal is generated and said detection signal is not generated, and said output signals include gate turn off signals for said self-turn-off devices connected to positive side of said DC bus lines when said detection signal is generated; and
   said output signals being applied to corresponding gates of said self-turn-off devices.

4. The voltage-type self-commutated conversion system according to claim 3:
   Wherein said protection means includes;
   a first protection circuit connected to said protection signal and said gate signals for said self-turn-off devices connected to positive side of said DC bus lines for generating first output signals, said first output signals being determined such that said first output signals include said gate signals when said protection signal is not generated and said first output signals include said gate turn on signals when said protection signal is generated;
   a second protection circuit connected to said protection signal and said gate signals for said self-turn-off devices connected to negative side of said DC bus lines for generating second output signals, said second output signals being determined such that said second output signals include said gate signals when said protection signal is not generated and said second output signals include said gate turn off signals when said protection signal is generated;

a third protection circuit connected to receive said first output signals, said second output signals and said detection signal for generating said output signals, said output signals being determined such that said output signals include said first output signals and said second output signals when said detection signal is not generated and said output signals include signals for turning off said self-turn-off devices connected to positive side of said DC bus lines when said detection signal is generated.

5. The voltage-type self-commutated conversion system according to claim 4:

wherein said first protection circuit includes a plurality of OR circuits, each of said gate signals being applied to one of first input terminals of said OR circuits, respectively, said protection signal being applied to all second input terminals of said OR circuits, and said OR circuits generating said first output signals at output terminals of said OR circuits;

wherein said second protection circuit includes a first inverter circuit for receiving said protection signal at an input terminal and a plurality of first AND circuits, each of said gate signals being applied to one of first input terminals of said first AND circuits, respectively, an output terminal of said first inverter circuit being connected to all second input terminals of said first AND circuits, and said first AND circuits generating said second output signals at output terminals of said first AND circuits; and wherein said third protection circuit includes a plurality of second inverter circuits, each of which receiving one of said detection signals at an input terminal thereof, respectively, and a plurality of second AND circuits, each of said first output signals being applied to one of first input terminals of said second AND circuits, respectively, each of output terminals of said second inverter circuits being connected to second input terminal of one of said second AND circuits, respectively and said second AND circuits generating said output signals for said self-turn-off devices connected to positive side of said DC bus lines at output terminals of said second AND circuits, and generating said second output signals as said output signals for said self-turn-off devices connected to negative side of said DC bus lines at output terminals of said third protection circuit.

6. The voltage-type self-commutated conversion system according to claim 3, wherein said detection circuit includes:

a plurality of absolute value detection circuits, each being connected to receive one of said converter output AC currents and for detecting an absolute value of one of said converter output AC currents, respectively;

a plurality of level detection circuits, each being connected to receive one of said absolute values and generating a detected signal when one of said absolute values is below a predetermined value, respectively; and a plurality Of AND circuits, each being connected to receive one of said detected signals at first input terminal and being connected to receive said protection signal at second input terminal, respectively;

whereby generating a plurality of output signals of said AND circuits as a plurality of said detection signals of said detection circuit.

* * * * *